United States Patent
Oshima (10) Patent No.: US 7,522,303 B2
(45) Date of Patent: Apr. 21, 2009

(54) PRINTER HAVING MULTIPLE INTERFACE UNITS THAT OUTPUT STATUS INFORMATION

(75) Inventor: Yasuhiro Oshima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 896 days.

(21) Appl. No.: 10/965,216

(22) Filed: Oct. 15, 2004

(65) Prior Publication Data
US 2005/0140711 A1 Jun. 30, 2005

(30) Foreign Application Priority Data
Oct. 16, 2003 (JP) ............................. 2003-356368

(51) Int. Cl.
- G06F 15/00 (2006.01)
- G06F 3/00 (2006.01)
- G06K 15/00 (2006.01)
- G03G 15/00 (2006.01)

(52) U.S. Cl. .................. 358/1.16; 358/1.1; 715/736; 399/8; 399/9; 710/18; 710/19

(58) Field of Classification Search .............. 358/1.1, 358/1.16; 710/18, 19; 715/736, 859; 399/8, 399/9, 10, 12
See application file for complete search history.

(56) References Cited

U.S. PATENT DOCUMENTS 6,532,351 B2* 3/2003 Richards et al. ............ 399/111
2002/0094207 A1* 7/2002 Richards et al. ............. 399/8

FOREIGN PATENT DOCUMENTS

JP 2003-291376 A 10/2003

* cited by examiner

*Primary Examiner*—Edward L Coles
*Assistant Examiner*—Thomas J Lett
(74) *Attorney, Agent, or Firm*—Sughrue Mion, PLLC (57) ABSTRACT

The printer 10 includes a user interface UI and a PC interface PIF that register specification information that specifies necessary status information, as well as a status management module DSM that, when status information regarding which the specification information is registered is changed, supplies the changed status information to the interface that carried out the registration of such information.

7 Claims, 5 Drawing Sheets

PRINTER HAVING MULTIPLE INTERFACE UNITS THAT OUTPUT STATUS INFORMATION

FIELD OF THE INVENTION

The present invention relates to a technology for handling status information regarding the state of progress of a printing process, and more particularly to the internal construction of a printing apparatus that outputs status information via multiple interfaces.

BACKGROUND OF THE INVENTION

A printing apparatus such as a printer of the type widely used as an output terminal for a computer or the like performs printing by receiving data from the computer and driving a print head to form dots on a recording medium such as paper. When the history of printers is reviewed, we see that at the beginning, printers included a character generator that developed fonts, using which printing was carried out based on text data received from the computer, whereupon a function to receive and print image data was added as the graphics processing functions of computers increased and became more widely available.

The printing of image data can be realized in many different ways, but from the standpoint of ensuring that such printing capability can handle the wide range of data generated by computer application programs, a standard construction has been adopted in which data that is compatible with the characteristics of the print head and paper feeder used by the printer is generated by a printer driver installed in the computer, and this data is forwarded to the printer, whereupon printing is carried out. This type of printer driver generates dot data to be formed by the print head based on preset data already stored in the printer driver regarding the printer's resolution, color reproduction capability including the number of inks, print head nozzle construction (the number and pitch of the nozzles), paper feed precision and the like. For example, if a printer comprising a printing apparatus includes the low-density ink colors of light cyan (LC) and light magenta (LM) in addition to the ink colors of cyan (C), magenta (M), yellow (Y) and black (K), and the print head is an inkjet print head that can eject ink drops of three different sizes, the printer driver rasterizes image data received from an application program, performs color correction, and carries out halftoning to express images using ink drops of three sizes and six colors.

On the other hand, with the recent popularity of digital still cameras (so-called digital cameras), PDAs, cellular phones and other peripheral devices, the demand for printing of data from such devices without the need for a computer has increased. Because these peripheral devices are limited in terms of the processing capabilities of their internal CPU and the amount of installed memory, they cannot easily carry out their own processing for the rasterizing, color correction, halftoning and other processes described above. Accordingly, a printing apparatus has been proposed wherein a module that performs such processes as rasterizing, color correction and halftoning is incorporated in the printer such that image data received from the peripheral device in JPEG or other format is processed within the printer before it is printed by the printer. As in the prior art, such a printing apparatus can also be connected to a computer for printing. Therefore, this type of printing apparatus can carry out printing using received print data that has already undergone image processing by the computer as well as printing using received raw image data that subsequently undergoes processing by the printer. The latter type of printing is called direct printing.

A printing apparatus that carries out these multiple printing processes includes multiple interfaces to enable communication with users, computers, peripheral devices and other external components and carry out exchange of information such as input of information pertaining to printing apparatus operating instructions and output of status information regarding the operating state of the printing apparatus to and from external devices via these multiple interfaces. This status information output to the user may be made using text or graphics displayed on a liquid crystal panel or via a voice message emitted from a speaker, and such output to a computer may be made in the form of data transmission over electrical signals.

SUMMARY OF THE INVENTION

However, this increase in the types of interfaces that has accompanied the expansion in new functions resulting from the desire to improve on the conventional printing apparatus, such as the new direct printing function, has tended to increase the complexity of the internal construction of the printing apparatus incorporating such interfaces, making it more difficult to attain error-free output of status information. In particular, where it is desired to have status information shared by these different interfaces in order to enable output from a newly added interface of the status information output by an existing interface, the problem has arisen that error-free sharing of such status information cannot be ensured. Furthermore, when it is desired to add a new interface to an already designed printing apparatus, the devotion of substantial development resources has been required to ensure the compatibility between the new interface and the other existing interfaces each time such an addition is to be made.

An object of the present invention is to resolve at least one of these problems and to provide an internal construction for a printing apparatus by which status information can be easily output via multiple interfaces.

In order to resolve the problem described above, the present invention is directed to a printing apparatus that executes a printing on a medium by driving a print head, said printing apparatus comprising: an interface unit group that includes two or more interface units that control exchange of information with an external source outside said printing apparatus; a print processing unit that executes printing processes related to said printing; and a status management unit that manages pieces of status information changed in response to progress of said printing processes, wherein at least one of said interface units comprises a specification registration unit that registers in said status management unit specification information for specifying said piece of status information, and said status management unit comprises an information supply unit that, when said specified piece of status information is changed, supplies said changed piece of status information to said interface unit that has registered said specification information.

According to this printing apparatus, by incorporating in at least one interface units a function to register specification information for specifying necessary the piece of status information in the status management unit, the status information can be output from the interface units. Where status information is to be shared between different interface units, such status information can be shared by incorporating in both interface units a function to register the specification information for the status information to be shared. Where a new interface unit is to be added to an already-designed printing apparatus, because the output of status information from the newly added interface unit can be realized simply by ensuring compatibility with the status management unit, the number of man-hours to develop the upgraded printing apparatus can be reduced. Therefore, the output of status information via multiple interface units can be easily achieved.

DESCRIPTION OF THE PREFERRED EMBODIMENTS

In order to further clarify the construction and operation of the present invention described above, a printer 10 in which the present invention is applied is described below.

Figure 1:
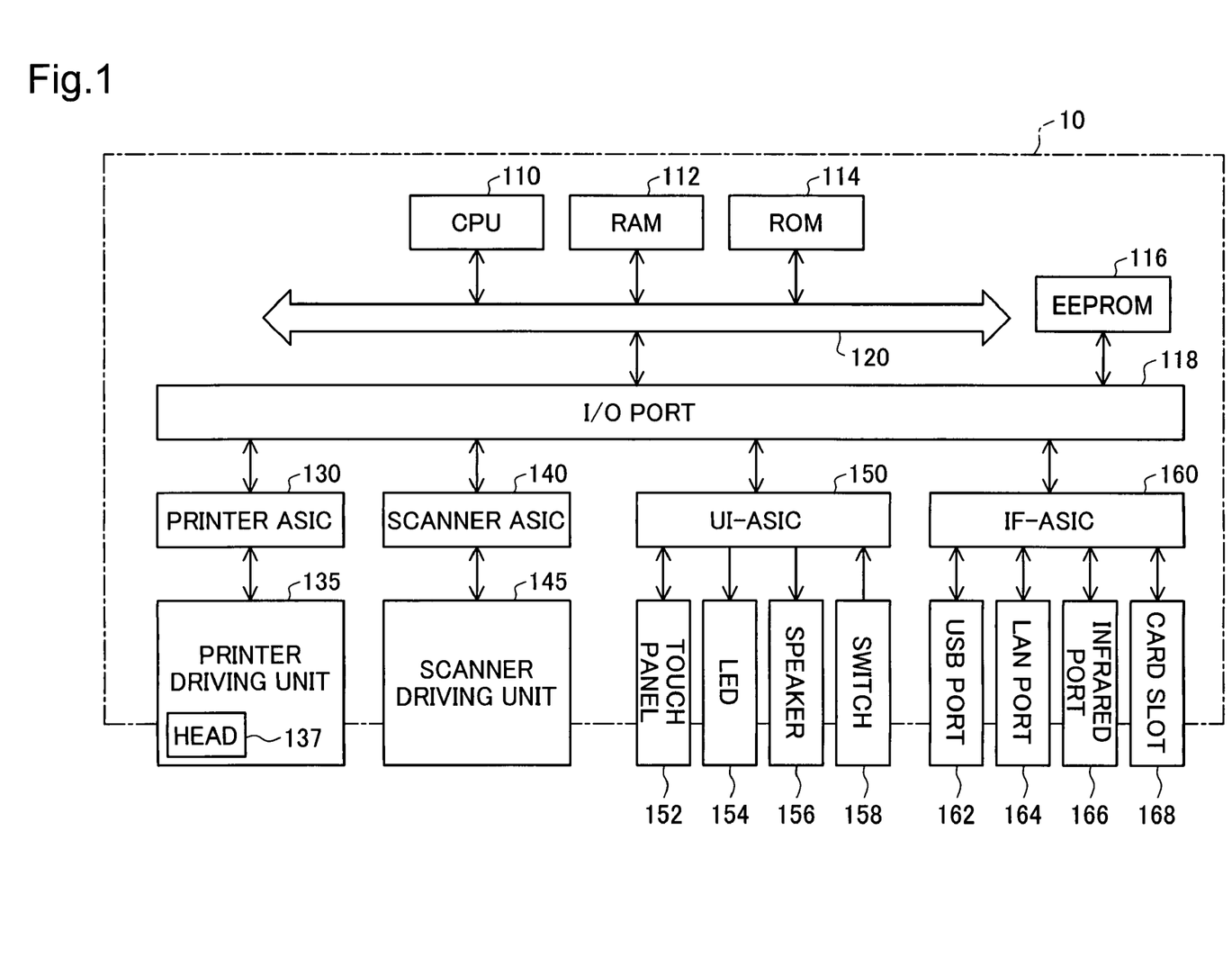
FIG. 1 is an explanatory drawing showing in a schematic fashion the hardware construction of the printer 10.

A. Construction of Printer 10:

A-(1). Hardware Construction:

The hardware construction of the printer 10 comprising an embodiment of the present invention will now be described. FIG. 1 is an explanatory drawing showing in a schematic fashion the hardware construction of the printer 10. The printer 10 is a printing apparatus that includes a printer driving unit 135 that drives a print head 137 and executes printing onto a medium such as paper. The printer 10 also includes in addition to the printer driving unit 135 a scanner driving unit 145 that converts images drawn on paper or the like into digital data and takes in such digital data, such that the image data received from the scanner driving unit 145 can be printed by the printer driving unit.

The printer 10 also includes various interfaces in addition to the printer driving unit 135 and the scanner driving unit 145. Among these included interfaces are user interfaces that control the exchange of information with the user, such as a touch panel 152 that facilitates exchange of information with the user via a screen, an LED 154 that transmits information to the user via light, a speaker 156 that transmits information to the user via voice or audio, and a switch 158 that receives input of information from the user via the turning ON and OFF of an electrical contact. At the same time, device interfaces that control the exchange of information with peripheral devices include a USB port 162, LAN port 164 and infrared port 166 that connect to a peripheral device such as a computer, digital camera or cellular telephone, as well as a card slot 168 that enables connection to one of various types of memory cards, such as a smart media card or a Compact Flash™ memory card.

The printer 10 includes a CPU 110 that performs overall control of the printer 10, a ROM 114 that stores programs that implement this control, a RAM 112 used for temporary storage of data and an I/O port 118 that serves as an interface with the CPU 110 and other control circuits. The CPU 110, ROM 114, RAM 112 and I/O port 118 are interconnected over a bus 120. Connected to the I/O port 118 are an EEPROM 116 in which internal information for the printer 10 is stored in a nonvolatile fashion, a printer ASIC 130 comprising a drive control circuit for the scanner driving unit 145, a UI-ASIC 150 comprising a drive control circuit for the user interfaces, and an IF-ASIC 160 comprising a drive control circuit for the device interfaces.

The printer 10 executes multiple printing processes and outputs from various interfaces as appropriate status information that changes in accordance with the status of progress of the printing process and is stored in the EEPROM 116 as internal information. The multiple printing processes executed by the printer 10 include a PC printing process that involves processing of print data from a computer based on an operating instruction from the computer, a scanner printing process that involves processing of image data received from the scanner driving unit 145 based on an operating instruction from the touch panel 152 or the like, a direct printing process that involves processing of image data from a digital still camera or memory card based on an operating instruction from the touch panel 152 or the like, a maintenance printing process that involves processing of maintenance information such as nozzle check or BAIDI check information based on an operating instruction from the touch panel 152 or the like, and a head cleaning process to clean the head 137 based on an operating instruction from the touch panel 152 or the like.

A-(2). Software Construction:

The software construction of the printer 10 will now be described. While the key elements of the hardware construction and printing processes of the printer 10 were described above, control of all hardware of the printer 10 is realized via execution by the CPU 110 of a program stored in the ROM 114. In other words, the various printing processes described above are realized via execution by the CPU 110 of a program stored in the ROM 114. Accordingly, the program executed by the CPU 110, i.e., the software construction, will now be described. The printer 10 of this embodiment has a construction whereby the various printing processes described above can be easily executed by dividing the software that executes the printing processes into modules and prescribing a mechanism for the exchange of data among the various modules.

Figure 2:
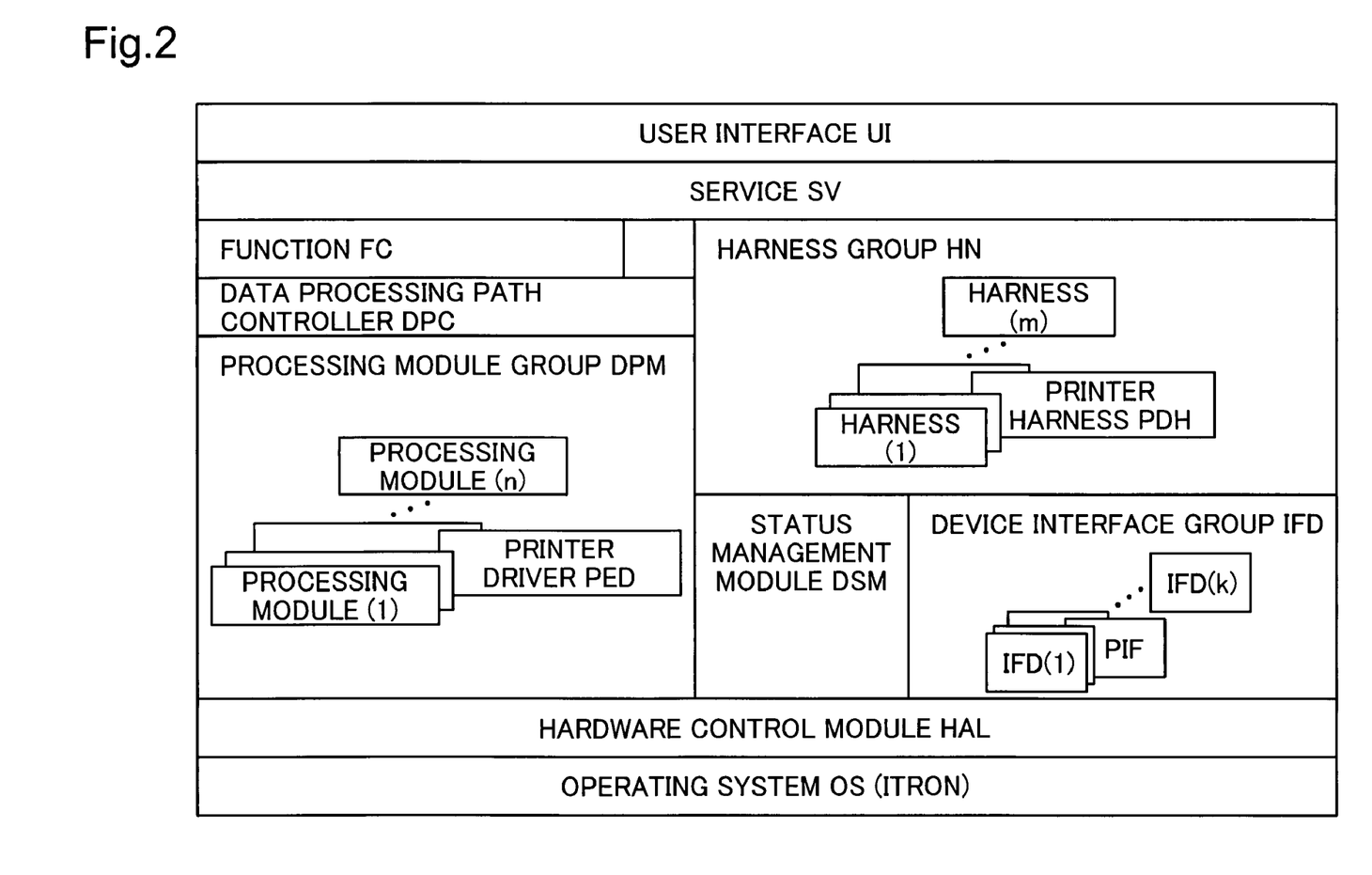
FIG. 2 is an explanatory drawing that shows in a schematic fashion the software construction of the printer 10.

FIG. 2 is an explanatory drawing that shows in a schematic fashion the software construction of the printer 10. The software construction shown in FIG. 2 is not the software construction corresponding to a particular printing process, but rather the general software construction for all printing processes carried out by the printer 10. When a given printing process is to be actually carried out, the needed module is re-established as described below.

At the base of the software modules that control the printer 10 operates ITRON, which serves as the operating system OS. All software is developed under ITRON, and all needed libraries are prepared in this environment. At the same time, the user interface UI that enables the software implementation of various control processes pertaining to the UI-ASIC 150 holds the top rank among these software modules, and under this user interface UI is a service SV that forces the user interface UI and the printer 10 to work together to enable the execution of various printing processes.

A hardware control module HAL resides above the operating system OS. This hardware module HAL is a module that controls the various hardware that are accessed via the I/O port 118, such as the EEPROM 116, the printer ASIC 130, the scanner ASIC 140, the UI-ASIC 150, the IF-ASIC 160 and the like.

Residing above the software control module HAL are a status management module DSM that executes various control processes related to the EEPROM 16 via software, a device interface group IFD that executes various control processes related to the IF-ASIC 160 via software, and a processing module group DPM that executes various control processes related to the printer ASIC 130 and the scanner ASIC 140 via software. The status management module DSM and the processing module group DPM, as well as the status management module DSM and the device interface group IFD, can call and be called by each other.

Residing in the device interface group IFD are (k) number of interface modules IFD(1) through IFD(k). These device interface modules IFD(1) through IFD(k) include a PC interface module PIF that governs the interface to a computer, a module that governs the interface to a digital still camera, and a module that governs the interface to a memory card.

Residing in the processing module group DPM are (n) modules comprising processing modules (1) through (n). These processing modules (1) through (n) include a module that prepares print data for printing, a module that modifies the prepared print data for printing, a printer driver PED that controls hardware including the head 137 in order to print the modified print data and a module that takes in images from the scanner drive unit 145.

A data processing path controller DPC resides above the processing module group DPM. This data processing path controller DPC has a table that stores the combinations of the processing modules (1) through (n) that are included in the processing module group DPM to execute multiple printing processes, such that when one of the multiple printing processes is specified, the data processing path controller DPC combines some of these multiple processing modules (1) through (n) included in the processing module group DPM in accordance with the combinations stored in the table to realize the specified printing process.

A function FC that implements a group of functions different from the functions prepared originally in the printer 10, such as communication with peripheral devices, resides between the data processing path controller DPC and the service SV. This function FC realizes functions that are called when, for example, an image in a memory card loaded into the card slot 168 is to be printed.

At the same time, a harness group HN that can call the data processing path controller DPC and the processing module group DPM resides between the status management module DSM and device interface group IFD and the service SV. This harness HN contains (m) modules referred to as harnesses (1) through (m). These harnesses (1) through (m) include a printer harness PDH that executes printer functions and harnesses for various functions such as a module to execute the scanner functions.

Through the above software construction, the service SV that receives a request from an external source via the user interface UI calls the data processing path controller DPC, the processing module group DPM or some other module via the harness group HN. The reason for creating this set of function-specific modules, referred to as harness group HN, is that in addition to various functions executed simply by software, data exchanges with the device interface group IFD, the status management module DSM and the like pertaining to such functions also take place inside the printer 10.

B. Operation of Printer 10:

B-(1). Data Exchange Between Modules:

The scheme governing the exchange of data between modules in the above software construction will now be described with a focus on the exchange of data pertaining to processing to output the status information described below. Each module supplies various functions to other modules, and other modules exchange data by calling these functions.

The functions 'DSM_Notification', 'DSM_De-Notification' and 'DSM_W-Data' are the functions supplied by the status management module DSM.

The 'DSM_Notification' function is a function by which to receive specification of status information to be monitored by the status management module DSM as well as specification of a callback function to be called by the status management module DSM when the status information has changed. When a different module calls the 'DSM_Notification' function from the status management module DSM, 'X1' and 'F1' are supplied as arguments. These arguments are described below.

X1: An argument that specifies status information to be monitored

F1: An argument that specifies the callback function to be called when the status information specified via X1 has changed.

The 'DSM_De-Notification' function is a function by which to receive termination of the monitoring specified using the 'DSM_Notification' function. The arguments for this function are 'X2' and 'F2', and are described below.

X2: An argument that specifies status information for which monitoring is to be terminated.

F2: An argument that specifies the callback function to be cancelled.

The 'DSM_W-Data' function is a function by which to receive changes in the status information stored in the status management module DSM. The argument for this function is 'X3', which specifies status information to be changed.

Functions supplied by the printer harness PDH in the harness group HN include the 'PDH_A-Request' and 'PDH_W-Data' functions.

The 'PDH_A-Request' function is a function by which to receive a request to initiate an action prepared in the printer harness beforehand and a specification of a method to report on the status of progress of such action. When a different module calls the 'PDH_A-Request' function from the printer harness PDH, the arguments 'Y1', 'PSP' and 'F2' are provided. These arguments are described below.

Y1: An argument that specifies a type of action for which initiation is requested.

PSP: An argument that specifies the total number of steps to be used to report on the status of progress of the action.

F2: An argument that specifies the callback function to be called when the status of the program is reported.

The 'PDH_W-Data' function is a function by which to receive provided status information. The argument for this function is 'Y2', which specifies status information to be received.

The functions provided by the user interface UI via the service SV include the 'UI_W-Data' function. The 'UI_W-Data' function is a function by which to receive status information from the harness group HN. Where the 'UI_W-Data' function is called by the harness group HN from the user interface UI in order to supply status information, the arguments 'U1' and 'SP' are supplied. These arguments are described below.

U1: An argument that indicates the type of action specified by the 'PDH_A-Request' action.

SP: An argument that indicates the number of steps in the action indicated by U1.

Functions provided by the PC interface PIF belonging to the device interface group IFD include the 'PIF_W-Data' function. The 'PIF_W-Data' function is a function by which to receive status information. The argument for this function is 'I1', which specifies status information to be received.

Functions provided by the printer driver PED belonging to the management module group DPM include the 'PED_Submit' function. The 'PED_Submit' function is a function by which to receive the specification of status information to be supplied by the printer driver PED and the specification of the method by which the status information is to be supplied.

When a different module calls the 'PED_Submit' function from the printer driver PED, the arguments 'Z1' and 'F3' are provided. These arguments are described below.

Z1: An argument that specifies which status information among all status information pertaining to the printer driver PED is to be supplied.

F3: An argument that specifies the callback function to be called when the status information specified by Z1 is supplied.

Figure 3:
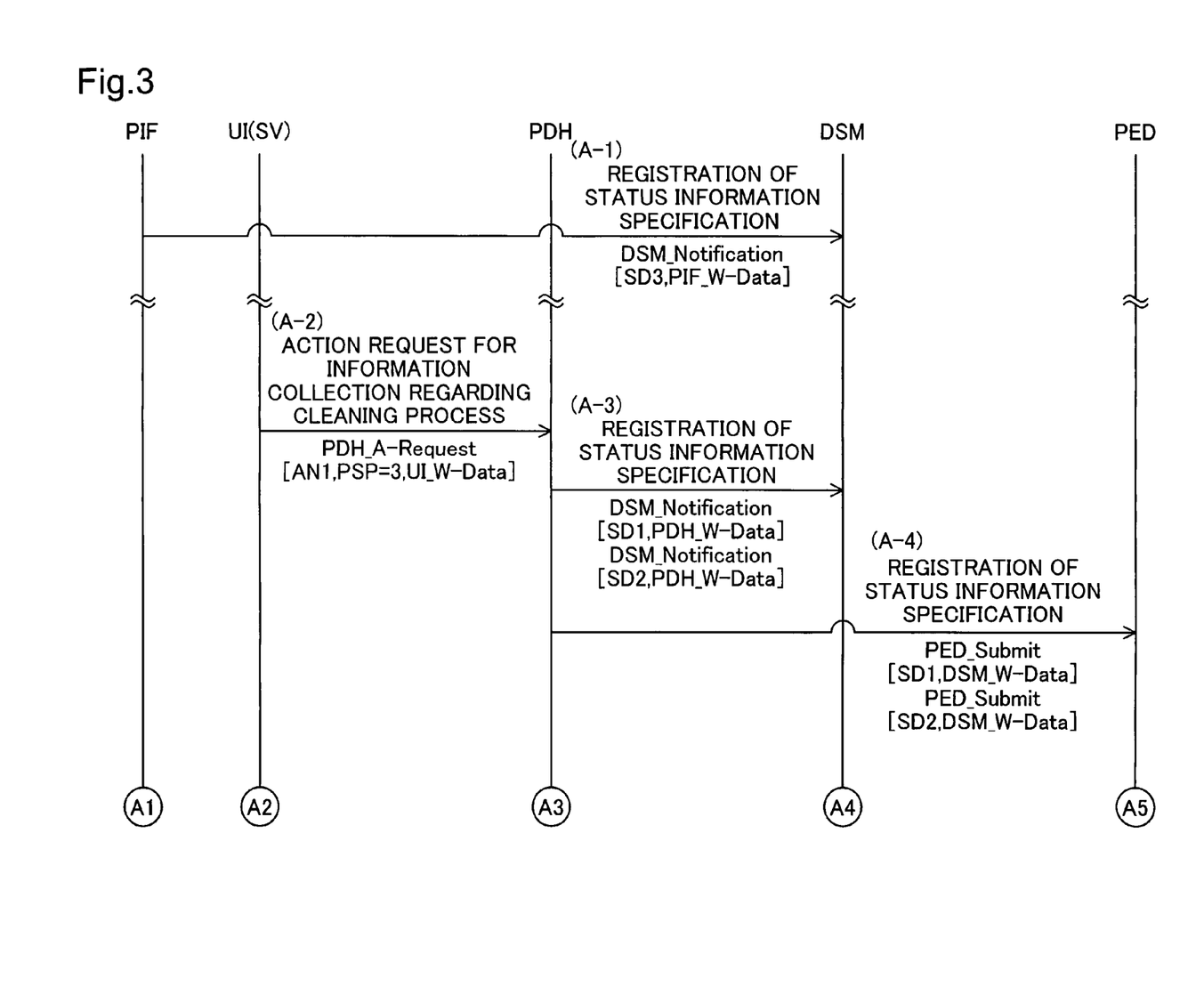
FIGS. 3 through 5 are explanatory drawings showing status information output processing for the head cleaning process.
Figure 4:
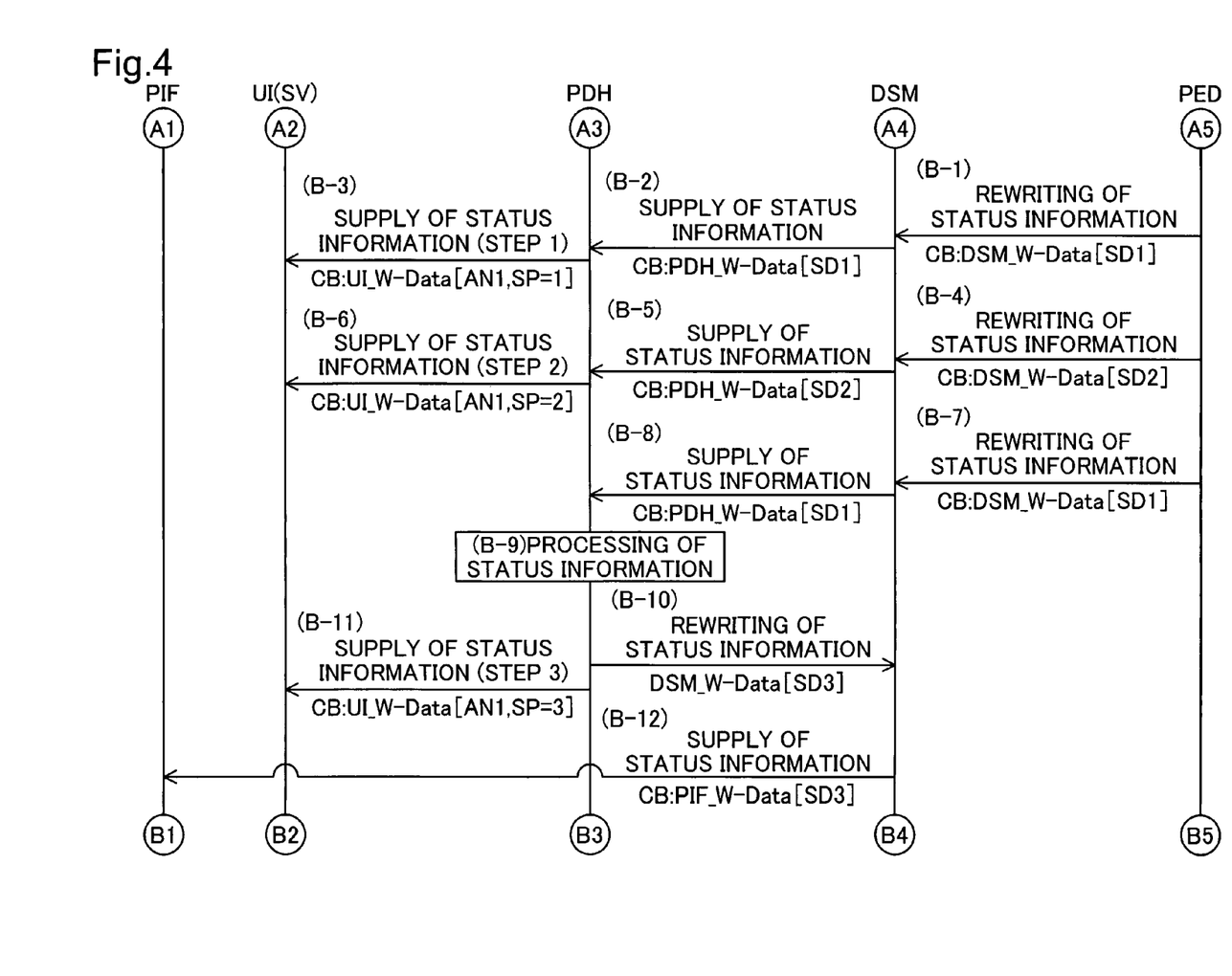
Figure 5:
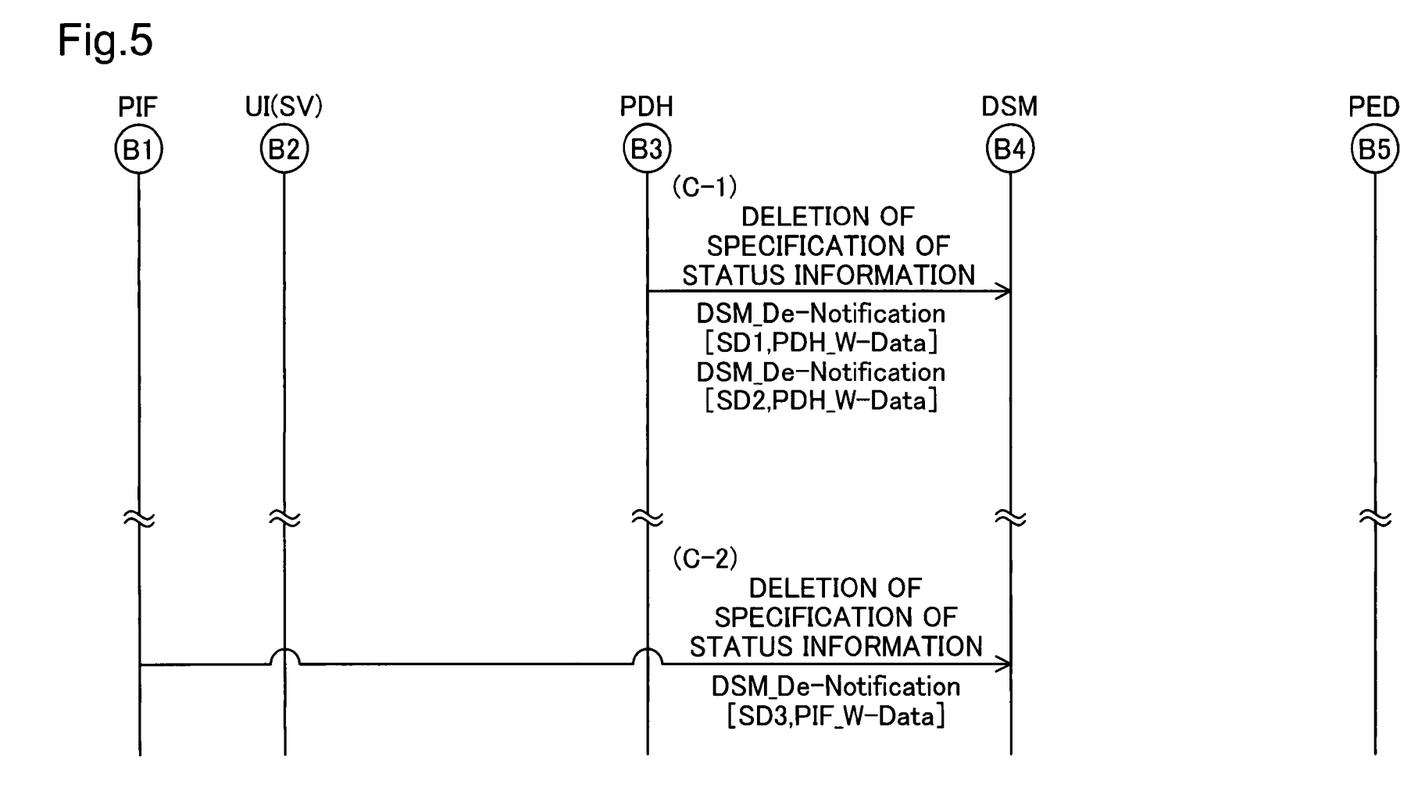

B-(2). Status Information Output Processing:

Status information output processing will now be described. Status information output processing is processing to output from the user interface UI or the device interface group IFD status information that is managed by the status management module and stored in the EEPROM 116. Here, as one type of status information output processing, output processing regarding status information for the head cleaning process comprising one of the multiple printing processes described above will be described. FIGS. 3 through 5 are explanatory drawings showing status information output processing for the head cleaning process. In the printer 10 of this embodiment, three status information items SD1-SD3 are handled during this status information output processing, information is reported to the user via the user interface UI based on the status information items SD1-SD3, and information is reported to peripheral devices via the PC interface PIF based on the status information item SD3.

The status information item SD1 comprises information indicating whether or not the head cleaning process is underway, and has a value of '1' where the process is underway and a value of '0' otherwise. The status information item SD2 comprises information indicating the scheduled amount of time required for head cleaning, and the value thereof while the head cleaning process is underway is the time required for the process, but is 'NULL' otherwise. The status information item SD3 comprises information indicating whether or not the head cleaning process was completed as scheduled, and the value thereof is '1' where the process was completed normally, while it is '0' if a fault occurred prior to completion.

Prior to the commencement of the head cleaning process, the PC interface PIF specifies and registers the status information item SD3 by calling the 'DSM_Notification' function from the status management module DSM. As the arguments for this function, the status information item SD3 is specified in the argument X1 and the 'PIF_W-Data' function is specified as the callback argument in the argument F1 (see (A-1) in FIG. 3). Specification and registration of the status information item SD3 by the PC interface PIF may be carried out during initialization of the printer 10 or after an instruction to execute the head cleaning process is received by the user interface UI.

At the same time, after the instruction to execute the head cleaning process is received but before the process is begun, the user interface UI requests performance of the action AN1 to obtain status information regarding the head cleaning process via calling of the 'PDH_A-Request' function from the printer harness PDH. This action AN1 is an action to supply the status information items SD1-SD3 to a different module. It supplies the status information item SD1 in a step 1, the status information item SD2 in a step 2, and the status information item SD3 in a step 3. As the function arguments in this case, the action AN1 is specified for the argument Y1, three steps are specified as the total number of steps for the argument PSP, and the 'UI_W-Data' function is specified as the callback function for the argument F2 (see (A-2) in FIG. 3).

The printer harness PDH from which the 'PDH_A-Request' function was called by the user interface UI begins the action AN1. When the action AN1 is begun, specification/registration of the status information items SD1 and SD2 is carried out by calling a 'DSM_Notification' function for each item from the status management module DSM. As the arguments for these functions, the status information items SD1 and SD2 are respectively specified for the argument X1, and 'PDH_W-Data' functions are respectively specified as callback functions for the argument F1. (see (A-3) in FIG. 3).

The printer harness PDH then instructs the writing of the status information items SD1 and SD2 to the status management module DSM by calling two 'PED_Submit' functions from the printer driver PED. As the arguments for these functions, the status information items SD1 and SD2 are respectively specified for the argument Z1, and 'DSM_W-Data' functions are respectively specified as the callback functions for the argument F3 (see (A-4) in FIG. 3).

When the printer driver PED begins control of the head cleaning process after the exchange of functions between modules as described above is completed, the printer driver PED rewrites the value of the status information item SD1 stored in the status management module DSM to '1' by calling the 'DSM_W-Data' function from the status management module DSM as the callback function for the 'PED_Submit' function (see (A-4) in FIG. 3). The status information item SD1 is specified for the argument X3 for this function (see (B-1) in FIG. 4).

The status management module DSM that receives the rewriting of the status information item SD1 supplies the status information item SD1 to the printer harness PDH by calling the 'PDH_W-Data' function as the callback function for the 'DSM_Notification' function (see (A-3) in FIG. 3). The status information item SD1 is specified for the argument Y2 for this function (see (B-2) in FIG. 4).

The printer harness PDH that receives this status information item SD1 supplies the status information item SD1 to the user interface UI by calling therefrom the 'UI_W-Data' function as the callback function for the 'PDH_A-Request' function (see (A-2) in FIG. 3) based on the processing of step 1 of the action AN1. As the arguments for this function, the action AN1 is specified for the argument U1 and step 1 is specified for the argument SP (see (B-3) in FIG. 4).

The printer driver PED then calculates the time required for the head cleaning process based on the degree of contamination of the head 137 or the like and rewrites the value of the status information item D2 stored in the status management module DSM by calling therefrom the 'DSM_W-Data' function as the callback function for the 'PED_Submit' function (see (A-4) in FIG. 3). The status information item SD2 is specified for the argument X3 for this function (see (B-4) in FIG. 4).

The status management module DSM that receives this rewriting of the status information item SD2 supplies the status information item SD2 to the printer harness PDH by calling therefrom the 'PDH_W-Data' function as the callback function for the 'DSM_Notification' function (see (A-3) in FIG. 3). The status information item SD2 is specified for the argument Y2 for this function (see (B-5) in FIG. 4).

The printer harness PDH that receives this status information item SD2 supplies the status information item SD2 to the user interface UI by calling therefrom the 'UI_W-Data' function as the callback function for the 'PDH_A-Request' function (see (A-2) in FIG. 3) based on the processing of step 2 of the action AN1. As the arguments for this function, the action AN1 is specified for the argument U1 and step 2 is specified for the argument SP (see (B-6) in FIG. 4).

Next, when the printer driver PED completes control of the head cleaning process, the printer driver PED rewrites the value of the status information item DS1 stored in the status management module DSM to '0' by calling therefrom the 'DSM_W-Data' function as the callback function for the 'PED_Submit' function (see (A-4) in FIG. 3). The status information item SD1 is specified for the argument X3 for this function (see (B-7) in FIG. 4).

The status management module DSM that receives this rewriting of the status information item SD1 supplies the status information item SD1 to the printer harness PDH by calling therefrom the 'PDH_W-Data' function as the callback function for the 'DSM_Notification' function (see (A-3) in FIG. 3). The status information item SD1 is specified for the argument Y2 for this function (see (B-8) in FIG. 4).

The printer harness PDH that receives the status information item SD1 generates a status information item SD3 by processing the status information items SD1 and SD2 as pre-processing for step 3 of the action AN1 (see (B-9) in FIG. 4). This status information item SD3 is generated by, for example, setting the value thereof to '0' when the time elapsed between the receipt of the initial status information item SD1 (see (B-2) in FIG. 4) and the receipt of the subsequent status information item SD1 (see (B-8) in FIG. 4) differed significantly from the scheduled time shown in the status information item SD2 and it is determined that completion therefore did not occur normally. Where this time difference falls within the permitted range, it is determined that completion occurred normally and the status information item SD3 is set to '1'.

After the status information item SD3 is generated (see (B-9) in FIG. 4), the printer harness PDH rewrites the value of the status information item SD3 stored in the status management module DSM by calling therefrom the 'DSM_W-Data' function. The status information item SD3 is specified for the argument X3 for this function (see (B-1) in FIG. 4).

After the value of the status information item SD3 is rewritten (see (B-10) in FIG. 4), the printer harness PDH supplies the status information item SD3 to the user interface UI by calling therefrom the 'UI_W-Data' function as the callback function for the 'PDH_A-Request' function (see (A-2) in FIG. 3) based on the processing of step 3 of the action AN1. As the arguments for this function, the action AN1 is specified for the argument U1 and step 3 is specified for the argument SP (see (B-11) in FIG. 4).

When the status information item SD3 is supplied to the user interface UI and the three steps comprising the total number of steps in the action AN1 are completed (see (B-11) in FIG. 4), the printer harness PDH deletes the specification of the status information items SD1 and SD2 (see (A-3) in FIG. 3) by calling from the status management module DSM two 'DSM_De-Notification' functions. As the arguments for these functions, the status information items SD1 and SD2 are respectively specified for the argument X2, and the 'PDH_W-Data' function is specified as the callback function for the argument X2 for each function (see (C-1) in FIG. 5). The printer harness PDH then ends the action AN1.

At the same time, the status management module DSM that receives the rewriting of the status information item SD3 (see (B-12) in FIG. 4) supplies the status information item SD3 to the PC interface PIF by calling therefrom the 'PIF_W-Data' function as the callback function for the 'DSM_Notification' function (see (A-1) in FIG. 3). The status information item SD3 is specified for the argument I1 for this function (see (B-12) in FIG. 4).

The PC interface PIF thereafter deletes the specification of the status information item SD3 (see (A-1) in FIG. 3) by calling from the status management module DSM the 'DSM_De-Notification' function. As the arguments for this function, the status information item SD3 is specified for the argument X2, and the 'PIF_W-Data' function is specified as the callback function for the argument F2 (see (C-2) in FIG. 5). It is also acceptable if the PC interface PIF always accepts the provision of the status information item SD3 without deleting the specification of the status information item SD3.

According to the printer 10 described above, the output of status information can be carried out from each interface by incorporating in the user interface UI and the PC interface PIF a function to register the specification of necessary status information in the status management module DSM. Where status information is to be shared between the user interface UI and the PC interface PIF, the status information can be shared by incorporating in both interfaces the function to register in the status management module DSM the specification of the status information to be shared. Where a new interface is to be added to an existing printer 10, because the output of status information from the newly added interface can be achieved if compatibility with the status management module DSM is taken into account, the number of man-hours required to develop the printer 10 can be reduced. Therefore, status information output via multiple interfaces can be easily achieved.

In addition, by deleting the registration of specification for unnecessary status information, processing to supply status information from the status management module DSM to the interfaces can be organized. As a result, deterioration in the overall processing speed of the printer 10 due to the execution of processes to supply unnecessary status information can be prevented.

Where status information is to be processed and output by the printer harness PDH, the processed status information can be stored in and managed by the status management module DSM. Consequently, status information to be processed by the printer harness PDH can be shared by ensuring compatibility between each interface and the status management module DSM rather than compatibility between the printer harness PDH and the PC interface PIF.

Furthermore, with regard to a particular print process, the sharing of status information between the user interface UI and the PC interface PIF can be attained through the operation of the printer harness PDH that mediates between the user interface UI and the data processing path controller DPC, processing module group DPM and status management module DSM. As a result, where an interface is to be newly added with respect to a certain print process mediated by the printer harness PDH, output of status information via multiple interfaces can be easily achieved by ensuring compatibility between the other interface and the printer harness PDH rather than compatibility between the other interface and the status management module DSM.

Moreover, because the processing modules belonging to the processing module group DPM, such as the printer driver PED, have a software construction that enables status information to be stored in the status management module DSM, even where a processing module is newly added to the processing module group DPM, output of status information from each interface can be easily achieved by ensuring compatibility between the newly added processing module and the status management module DSM.

C. Other Embodiments

While an embodiment of the present invention was described above, the present invention is not limited to this embodiment in any way. The present invention may be modified or improved within the essential scope thereof and the claims pertaining thereto, and equivalent methods and technologies are naturally incorporated therein. For example, the status information output processing is not limited to that used during the head cleaning process, and various types of status information pertaining to other printing processes may be handled. The rewriting of status information to the status management module DSM need be carried out solely by the printer driver PED, and may be performed by a different processing module belonging to the processing module group DPM. Similarly, the PC interface PIF is not the only member of the device interface group IFD that can receive status information, and such information may be supplied to a different interface.

What is claimed is:

1. A printing apparatus that executes a printing on a medium by driving a print head, said printing apparatus comprising:

an interface unit group that includes two or more interface units that control exchange of information with an external source outside said printing apparatus;

a print processing unit that executes printing processes related to said printing; and a status management unit that manages pieces of status information changed in response to progress of said printing processes, wherein each of a plurality of said interface units comprises a specification registration unit that registers in said status management unit specification information for specifying said piece of status information, and said status management unit comprises an information supply unit that, when said specified piece of status information is changed, supplies said changed piece of status information to said interface unit that has registered said specification information.

2. The printing apparatus according to claim 1, wherein said interface unit comprising said specification registration unit further comprises a specification deletion unit that deletes said specification information registered in said status management unit.

3. The printing apparatus according to claim 1, wherein said specification information is registered in said status management unit when a prescribed printing process among said printing processes is initiated, said specified piece of status information is changed in response to said prescribed printing process, and said interface unit that comprising said specification registration unit further comprises a specification deletion unit that, when said prescribed printing process is completed, deletes said specification information registered in said status management unit.

4. The printing apparatus according to claim 1, wherein said interface unit comprising said specification registration unit further comprises an information modification unit that modifies said piece of status information supplied from said status management unit and supplies said modified piece of status information to said status management unit.

5. The printing apparatus according to claim 1, wherein said interface unit group includes a user interface unit that controls said exchange of information with an user of said printing apparatus and/or a device interface unit that controls said exchange of information with a peripheral device.

6. The printing apparatus according to claim 1, wherein said print processing unit includes:

a processing module group that includes a module that prepares print data for said printing, a module that processes said prepared print data for said printing and a module that controls hardware including said print head in order to print said processed print data, a combination storage unit that stores combinations of at least two of said modules for realizing said printing processes, and a print realization unit that, when one of said printing processes is specified, combines some of said modules in accordance with said stored combination to realize said specified printing process, wherein at least one of said combined modules supplies said piece of status information to said status management unit.

7. A printing that apparatus that executes a printing on a medium by driving a print head, said printing apparatus comprising:

an interface unit group that includes two or more interface units that control exchange of information with an external source outside said printing apparatus;

a print processing unit that executes printing processes related to said printing; and a status management unit that manages pieces of status information changed in response to progress of said printing processes, wherein at least one of said interface units that comprises a specification registration unit that registers in said status management unit specification information for specifying said piece of status information, and said status management unit comprises an information supply unit that, when said specified piece of status information is changed, supplies said changed piece of status information to said interface unit that has registered said specification information;

wherein said interface unit group includes:

a first interface unit that receives from said external source an instruction regarding said printing process and reports to said external source said progress of said printing process for which said instruction is received;

a second interface unit that mediates exchange of information between said first interface unit and said print processing unit; and a third interface unit that reports to said external source said progress of said printing process for which said instruction received in a different mode from said first interface unit, wherein said second interface unit comprises:

a second specification registration unit that registers in said status management unit said specification information for specifying said piece of status information changed in response to said progress of said printing process for which said instruction is received by said first interface unit;

a second information receiving unit that receives said piece of status information supplied from said status management unit based on said specification information registered by said second specification registration unit;

an information modification unit that modifies said received piece of status information; and an interface supply unit that supplies said modified piece of status information to said first interface unit and said status management unit, wherein said third interface unit comprises:

a third specification registration unit that registers in said status management unit said specification information for specifying said modified piece of status information; and a third information receiving unit that receives said piece of status information supplied from said status management unit based on said specification information registered by third specification registration unit.

* * * * *